United States Patent [19]
Lin

[11] Patent No.: US 6,286,845 B1
[45] Date of Patent: Sep. 11, 2001

[54] FOLDING STRUCTURE FOR MAIN HANDLE OF HANDLE-CONTROLLED SKATE BOARD

[75] Inventor: Sonny Lin, Changhua Hsien (TW)

[73] Assignee: Den Liang Industrial Co., Ltd., Changhua Hsien (TW)

[ * ] Notice: Subject to any disclaimer, the term of this patent is extended or adjusted under 35 U.S.C. 154(b) by 0 days.

[21] Appl. No.: 09/569,872

[22] Filed: May 12, 2000

[51] Int. Cl.[7] .............................. B62M 1/00; E05D 7/083
[52] U.S. Cl. ............................... 280/87.05; 280/87.041; 16/324; 403/325
[58] Field of Search ...................... 280/87.05, 87.01, 280/87.021, 87.041, 87.042, 14.27; 16/324, 326; 403/321, 322.1, 322.3, 322.4, 324, 325

[56] References Cited

U.S. PATENT DOCUMENTS

| | | | |
|---|---|---|---|
| 4,707,884 | * 11/1987 | Chang | 280/87.05 |
| 5,595,392 | * 1/1997 | Casillas | 280/87.05 |
| 5,927,733 | * 7/1999 | Banda | 280/87.05 |
| 5,961,130 | * 10/1999 | Gorza et al. | 280/87.05 |
| 6,120,044 | * 9/2000 | Tsai | 280/87.05 |
| 6,158,751 | * 12/2000 | Wu et al. | 280/87.05 |
| 6,173,976 | * 1/2001 | Lee | 280/87.05 |
| 6,182,988 | * 2/2001 | Wu | 280/87.05 |
| 6,199,880 | * 3/2001 | Favorito et al. | 280/87.05 |
| 6,234,501 | * 5/2001 | Chen | 280/87.05 |

* cited by examiner

Primary Examiner—Michael Mar
Assistant Examiner—Jeffrey Restifo
(74) Attorney, Agent, or Firm—Bacon & Thomas

(57) ABSTRACT

Folding structure for main handle of handle-controlled skate board, including a T-shaped fixing section integrally formed on upper side of front end of a body of the handle-controlled skate board. An upper side of front portion of a longitudinal section of the T-shaped fixing section is formed with a guiding inclination angle. A lower side of the guiding inclination angle is formed with an arch locating notch immediately adjacent to the guiding inclination angle. Two spring engaging bodies respectively laterally protrude from two sides of the middle of the longitudinal section of the T-shaped fixing section near the top face thereof. A rear section of the T-shaped fixing section is formed with a pivot hole near the center thereof. A supporting frame is welded on rear side of the stem. A lower side of front section of the supporting frame is formed with an arch escape recess. A middle portion of the escape recess is formed with a spring locating groove. A bottom of the supporting frame is formed with a transverse mating channel. The front section of the supporting frame is formed with a slide way behind the escape recess. A through hole is formed on upper side of the slide way. A lower side of rear section of the supporting frame is formed with a pivot hole. The supporting frame is formed with several perforations. The supporting frame is co-used with a tail-to-tail fastening bolt set, a fast detachable sleeve, a fast detachable assembly, a spring fixing spindle, a double twisting spring and two C-shaped latch rings for foldably associating the body with the stem.

3 Claims, 4 Drawing Sheets

FOLDING STRUCTURE FOR MAIN HANDLE OF HANDLE-CONTROLLED SKATE BOARD

BACKGROUND OF THE INVENTION

The present invention relates to a folding structure for main handle of handle-controlled skate board. The folding structure is not subject to abrasion and is more rigid and durable. In addition, in use, there are two fixing structures so that the safety in use can be ensured.

The existing handle-controlled skate board is required to have light weight and reduced volume for facilitating storage and carriage. Therefore, the handle-controlled skate board is designed with folding structure for folding the handle-controlled skate board and reducing the volume thereof. The attachment shows a folding device of a handle-controlled skate board disclosed in Taiwanese Patent Application No. 087215733 filed on Sep. 21, 1998 and published on Dec. 21, 1999 under Publication No. 377689. Such folding device has some shortcomings as follows:

1. The handle stem 4 and the connecting frame 5 are located in such a manner that one end of an extension spring S is fixed on a pin shaft 6, while the other end thereof downward pulls the stop post 7 to automatically engage with the stop channel 32 of two ends of the arch rail 31 and locate therein. The location is achieved simply by the extension spring S so that the safety in riding can be hardly ensured. For example, in riding, the stop post 7 is subject to external force such as rebounding force and tends to disengage from the stop channel 32. This will lead to danger.

2. The handle stem 4 is foldably located on the body of the handle-controlled skate board in such a manner that the stop post 7 is passed through the arch rail 31 of the connecting seat 3 and the shaft hole 51 of the connecting frame 5. The extension spring S downward pulls the stop post 7, permitting the stop post 7 to slidably locate in the arch rail 31. However, the stop post 7 is subject to abrasion and the diameter of the stop post 7 will be reduced after a period of use or the diameter of the arch rail 31 will be expanded due to a long period of wearing. Therefore, a gap will exist between the stop post 7 and the arch rail 31 and the handle will swing during riding to lead to danger.

3. The U-shaped connecting seat 3 (or two plate bodies each being formed with an arch rail 31 and stop channel 32) is locked or welded on the end of the body 2 by screws. The handle stem 4, connecting frame 5, pin shaft 6 and the stop post 7 are disposed on the connecting seat 3. During riding, most of the force application points fall onto the connecting seat 3. However, the connecting seat 3 has insufficient strength and is subject to damage. This will result in danger during riding.

SUMMARY OF THE INVENTION

It is therefore a primary object of the present invention to provide a folding structure for main handle of handle-controlled skate board in which there are two security locations for both folding and unfolding states of the handle-controlled skate board so that no matter whether when a user rides or transfers the handle-controlled skate board, the stem will not loosen and the safety in riding can be ensured.

It is a further object of the present invention to provide the above folding structure for main handle of handle-controlled skate board in which the fast detachable sleeve is slided within the slide way only by small travel for location and during sliding, no force normal to the frictional face is created so that no abrasion will take place and the device can be more durably used.

It is still a further object of the present invention to provide the above folding structure for main handle of handle-controlled skate board in which after the T-shaped fixing section of the body is associated with the supporting frame of the stem, the longitudinal section of the T-shaped fixing section is snugly fitted into the mating channel of the supporting frame to form a concrete structure which has better strength and durability.

It is still a further object of the present invention to provide the above folding structure for main handle of handle-controlled skate board in which the supporting frame is integrally made of aluminum extrusion and formed with several perforations so that the supporting frame has light weight and high strength.

The present invention can be best understood through the following description and accompanying drawings wherein:

DETAILED DESCRIPTION OF THE PREFERRED EMBODIMENT

Figure 1:
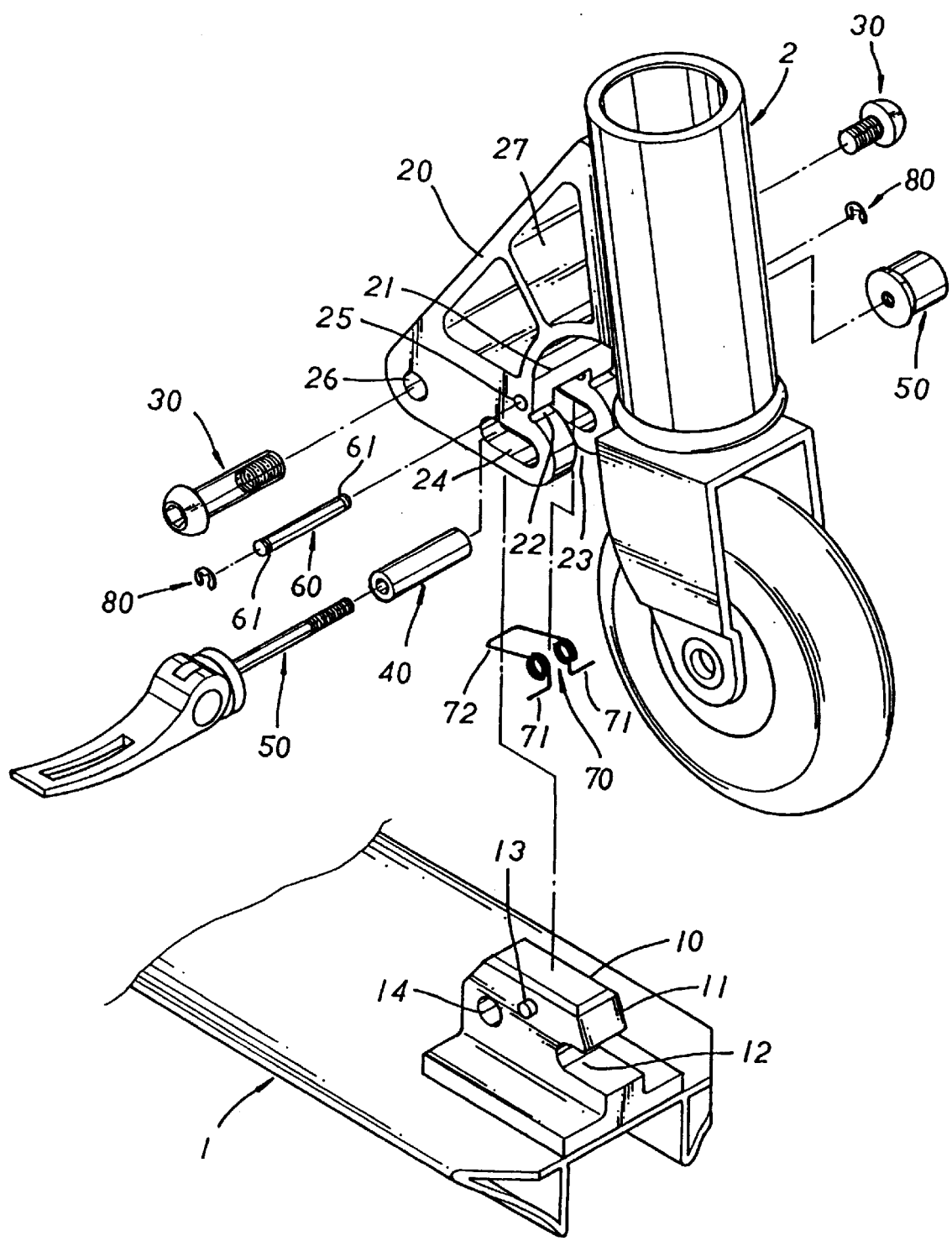
FIG. 1 is a perspective exploded view of the present invention.

Please refer to FIG. 1. A reverse T-shaped fixing section 10 is integrally formed on upper side of front end of the body 1 of the handle-controlled skate board. An upper side of front portion of a longitudinal section of the T-shaped fixing section 10 is formed with a guiding inclination angle 11. A lower side of the guiding inclination angle 11 is formed with an arch locating notch 12 immediately adjacent to the guiding inclination angle 11. In addition, two spring engaging bodies 13 respectively resiliently laterally protrude from two sides of the middle of the longitudinal section of the T-shaped fixing section 10 near the top face thereof. A rear section of the T-shaped fixing section 10 is formed with a pivot hole 14 near the center thereof. A triangular supporting frame 20 is welded on rear side of the stem 2. The supporting frame 20 integrally made of aluminum extrusion. A lower side of front section of the supporting frame 20 is formed with an arch escape recess 21. The middle of the escape recess 21 is formed with a spring locating groove 22. The bottom of the supporting frame 20 is formed with a transverse mating channel 23. The front section of the supporting frame 20 is formed with a slide way 24 passing through the mating channel 23 behind the escape recess 21. A through hole 25 is formed on upper side of the slide way 24. In addition, a lower side of rear section of the supporting frame 20 is formed with a pivot hole 26 passing through the mating channel 23. Also, the supporting frame 20 is formed with several perforations 27. The supporting frame 20 is co-used with a tail-to-tail fastening bolt set 30, a fast detachable sleeve 40, a fast detachable assembly 50, a spring fixing spindle 60, a double twisting spring 70 and two C-shaped latch rings 80. The sleeve 40 has such an outer diameter that it is snugly fitted in the locating notch 12 of the T-shaped fixing section 10. The spring fixing spindle 60 has such an outer diameter that it is snugly fitted in the through hole 25 of the supporting frame 20. Two end sections of the spring fixing spindle 60 are respectively formed with two latch ring grooves 61. Two L-shaped engaging legs 71 respectively outward extend from two ends of the double twisting spring 70. The middle thereof has a rearward extending U-shaped latch rack 72.

Figure 2:
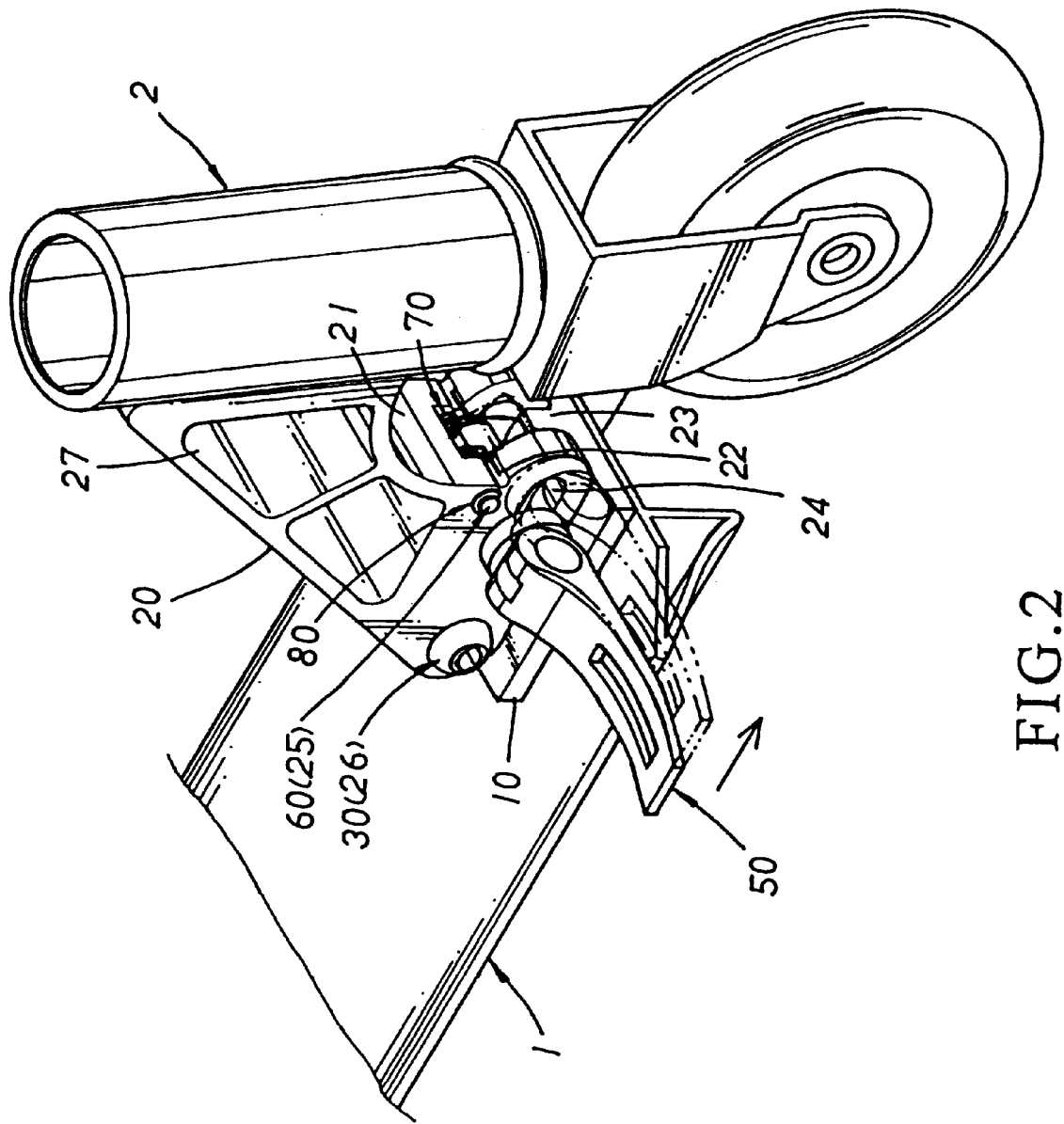
FIG. 2 is a perspective assembled view of the present invention in an unfolded state.

When assembled, as shown in FIG. 2, the mating channel 23 of the supporting frame 20 of the stem 2 is aimed at and fitted onto the longitudinal section of the T-shaped fixing section 10 of the body 1. At this time, the spring engaging bodies 13 of the T-shaped fixing section 10 are pressed and retracted by two sides of the mating channel 23 of the supporting frame 20. Then the tail-to-tail fastening bolt set 30 is passed through the pivot holes 14, 26 of the supporting frame 20 and the T-shaped fixing section 10. Therefore, the stem 2 can be pivotally rotated about the tail-to-tail fastening bolt set 30 on the body 1. Then the fast detachable sleeve 40 is fitted into the slide way 24 of the supporting frame 20 and the locating notch 12 of the T-shaped fixing section 10. Then the fast detachable assembly 50 is fitted into the central hole of the fast detachable sleeve 40 and tightly locked therein. Then the coil springs of the double twisting spring 70 are positioned on upper side of front section of the mating channel 23 between the through holes 25 of the supporting frame 20. The L-shaped engaging legs 71 are received in the spring locating grooves 22 of the supporting frame 20. The U-shaped latch rack 72 is backward pressed against the front side of the fast detachable sleeve 40, whereby the fast detachable sleeve 40 and the fast detachable assembly 50 are forcedly pushed backward. Then the spring fixing spindle 60 is passed through the through hole 25 of the supporting frame 20 as well as the coil springs of the double twisting spring 70 so as to fix the double twisting spring 70 therebetween. Finally, the two C-shaped latch rings 80 are respectively latched in the latch ring grooves 61 of the spindle 60 to complete the assembly.

Figure 3:
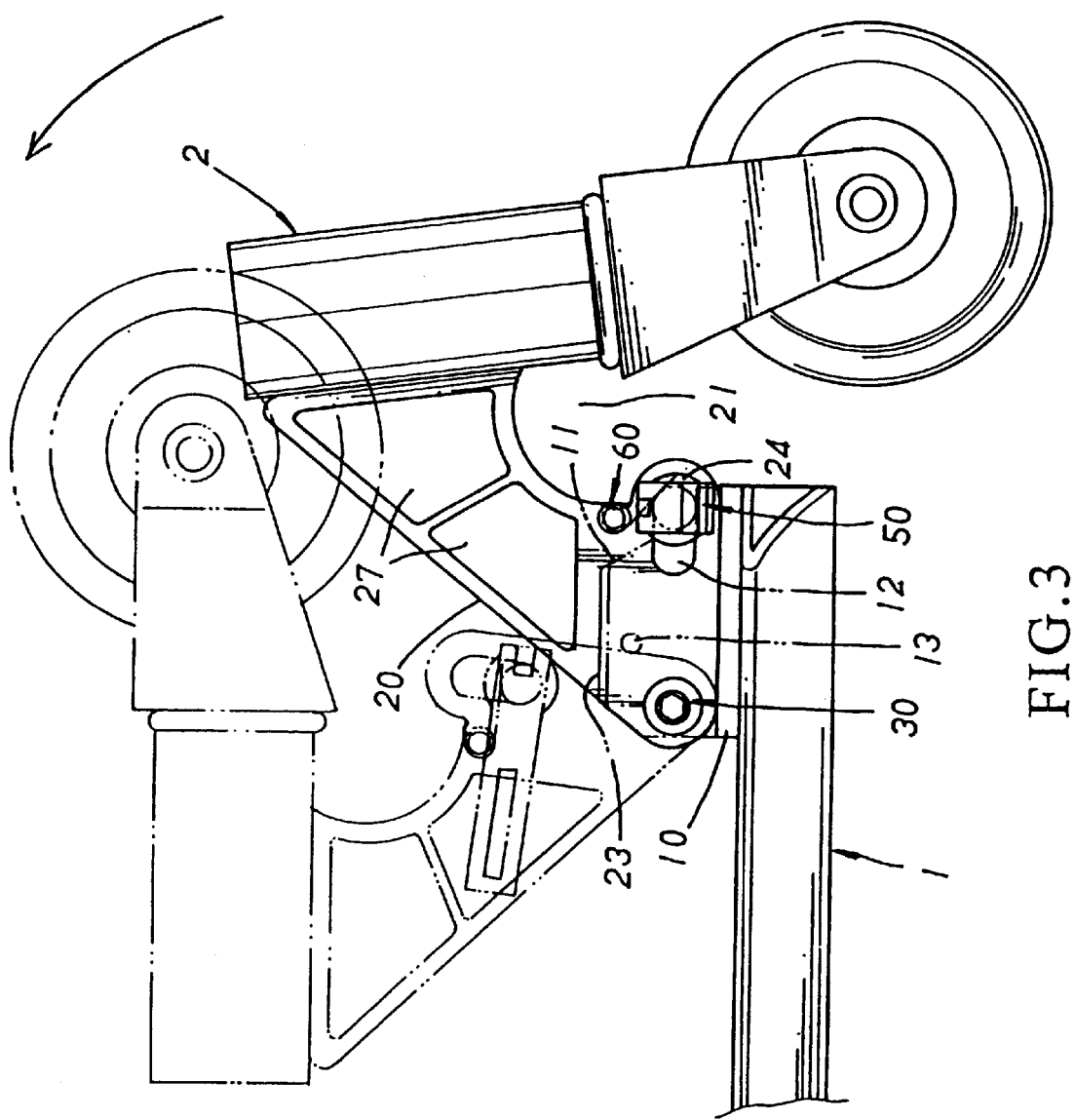
FIG. 3 is a side view of the present invention, showing the folding operation thereof.

When folded, referring to FIGS. 2 and 3, first the fast detachable assembly 50 is untightened and then the fast detachable assembly 50 together with the fast detachable sleeve 40 is pushed from the rear side of the slide way 24 to the front side thereof, whereby the fast detachable assembly 50 and the fast detachable sleeve 40 are disengaged from the locating notch 12 of the T-shaped fixing section 10. Then the stem 2 is rearward pivotally rotated about the tail-to-tail fastening bolt set 30. After the stem 2 is rotated by a certain angle and the bottom of the supporting frame 20 is disengaged from two sides of the T-shaped fixing section 10, the spring engaging bodies 13 are released from the pressing force and bounded outward to engage with the bottom of the supporting frame 20. Under such circumstance, the stem 2 cannot be rotated back. This is a first security location. At this time, the U-shaped latch rack 72 of the double twisting spring 70 makes the fast detachable assembly 50 and the fast detachable sleeve 40 bound back to their home positions so that the fast detachable assembly 50 is again locked up. This a second security location. At this time, the stem 2 is completely folded.

Figure 4:
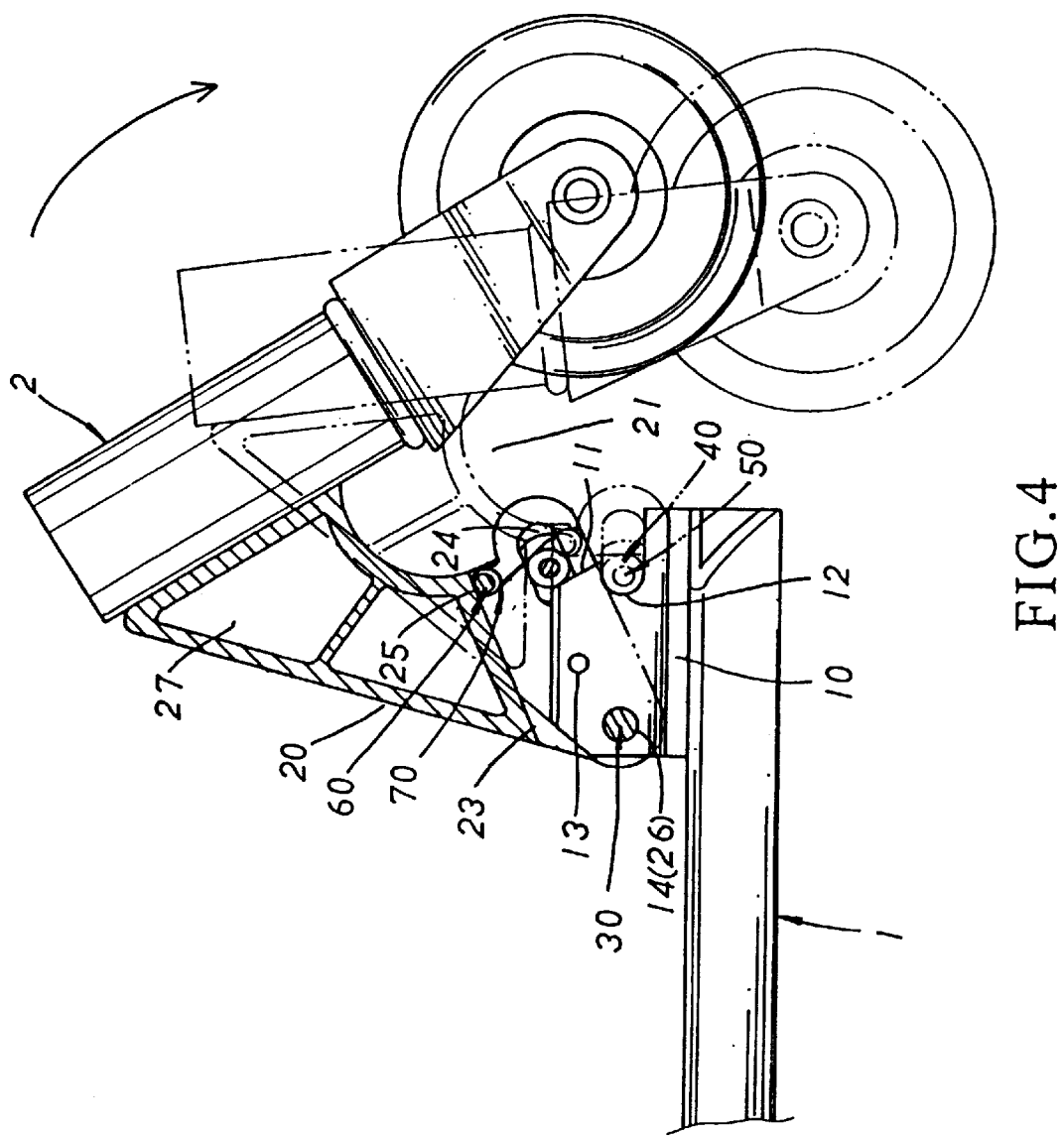
FIG. 4 is a side view of the present invention, showing the unfolding operation thereof.

When used, as shown in FIG. 4, first the fast detachable assembly 50 is released and then the spring engaging bodies 13 of the T-shaped fixing section 10 are depressed, permitting the stem 2 to be downward rotated. When rotated, the fast detachable assembly 50 and the fast detachable sleeve 40 will touch the guiding inclination angle 11 to create a forward pushing force therealong. When reaching the locating notch 12, the fast detachable assembly 50 and the fast detachable sleeve 40 are bounded into the locating notch 12 by the U-shaped latch rack 72 of the double twisting spring 70. This a first security location. Then the fast detachable assembly 50 is again locked up. This is a second security location. At this time, the stem 2 is completely unfolded for use and riding.

According to the above arrangement, the present invention has the following advantages:

1a. There are two security locations for both folding and unfolding states of the handle-controlled skate board so that no matter whether a user rides or transfers the handle-controlled skate board, the stem will not loosen and the safety in riding can be ensured.

2a. The fast detachable sleeve 40 is slided within the slide way 24 only by small travel for location and during sliding, no force normal to the frictional face is created so that no abrasion will take place and the device can be more durably used.

3a. After the T-shaped fixing section 10 of the body 1 is associated with the supporting frame 20 of the stem 2, the longitudinal section of the T-shaped fixing section 10 is snugly fitted into the mating channel 23 of the supporting frame 20 to form a concrete structure which has better strength and durability.

4a. The supporting frame 20 is integrally made of aluminum extrusion and formed with several perforations 27 so that the supporting frame 20 has light weight and high strength.

The above embodiment is only used to illustrate the present. invention, not intended to limit the scope thereof. Many modifications of the above embodiment can be made without departing from the spirit of the present invention.

What is claimed is:

1. Folding structure for a stem that supports a main handle of handle-controlled skate board, comprising a T-shaped fixing section disposed on upper side of front end of a body of the handle-controlled skate board, an upper side of front portion of a longitudinal section of the T-shaped fixing section being formed with a guiding inclination angle, a lower side of the guiding inclination angle being formed with an arch locating notch immediately adjacent to the guiding inclination angle, two spring engaging bodies respectively laterally protruding from two sides of the middle of the longitudinal section of the T-shaped fixing section near the top face thereof, a rear section of the T-shaped fixing section being formed with a pivot hole near the center thereof, a triangular supporting frame being welded on rear side of the stem, a lower side of front section of the supporting frame being formed with an arch escape recess, a middle portion of the escape recess being formed with a spring locating groove, a bottom of the supporting frame being formed with a transverse mating channel, the front section of the supporting frame being formed with a slide way behind the escape recess, a through hole being formed on upper side of the slide way, a lower side of rear section of the supporting frame being formed with a pivot hole, the supporting frame being co-used with a tail-to-tail fastening bolt set, a fast detachable sleeve, a fast detachable assembly, a spring having L-shaped engaging legs, fixing spindle, a double twisting spring and two C-shaped latch rings, whereby the mating channel of the supporting frame of the stem is fitted onto the longitudinal section of the T-shaped fixing section of the body, the tail-to-tail fastening bolt set being passed through the pivot holes of the supporting frame and the T-shaped fixing section and fastened, the fast detachable assembly being fitted into the central hole of the fast detachable sleeve and then together therewith fitted into the slide way of the supporting frame and the locating notch of the T-shaped fixing section and locked therein, the spring fixing spindle being passed through the through hole of the supporting frame as well as the coil springs of the double twisting spring, the L-shaped engaging legs of the double twisting spring being received in the spring locating grooves of the supporting frame, the U-shaped latch rack being backward pressed against the front side of the fast detachable sleeve, the C-shaped latch rings being latched in the latch ring grooves of the spring fixing spindle.

2. Folding structure for main handle of handle-controlled skate board as claimed in claim 1, wherein the T-shaped fixing section is integrally formed with the body of the handle-controlled skate board.

3. Folding structure for main handle of handle-controlled skate board as claimed in claim 1, wherein the supporting frame is integrally made of aluminum extrusion and formed with several perforations for reducing weight and achieving better strength.

\* \* \* \* \*